T. H. LEAVITT.
Peat Machine.
No. 53,011.
3 Sheets—Sheet 1.
Patented March 6, 1866.
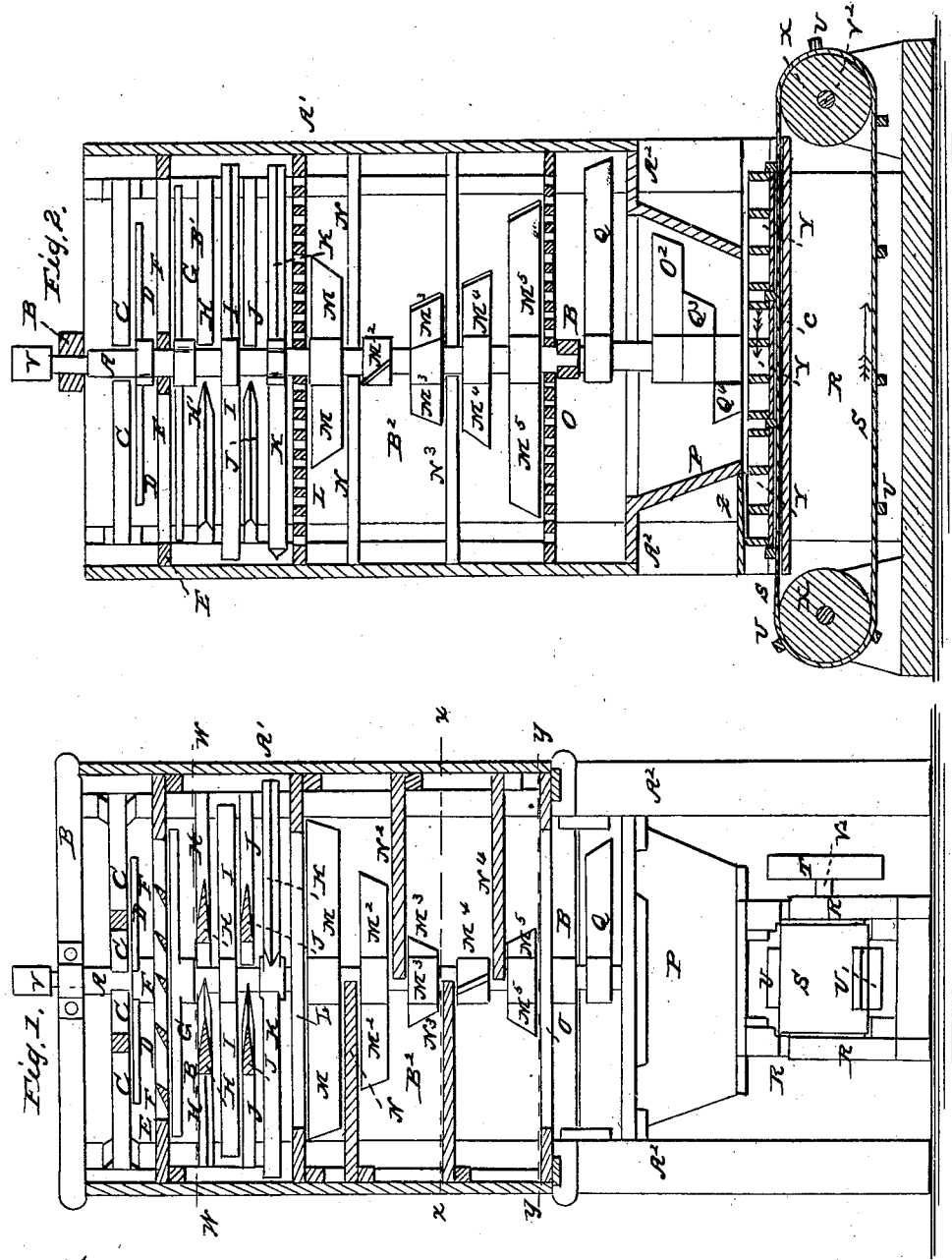
Witnesses:
Inventor:

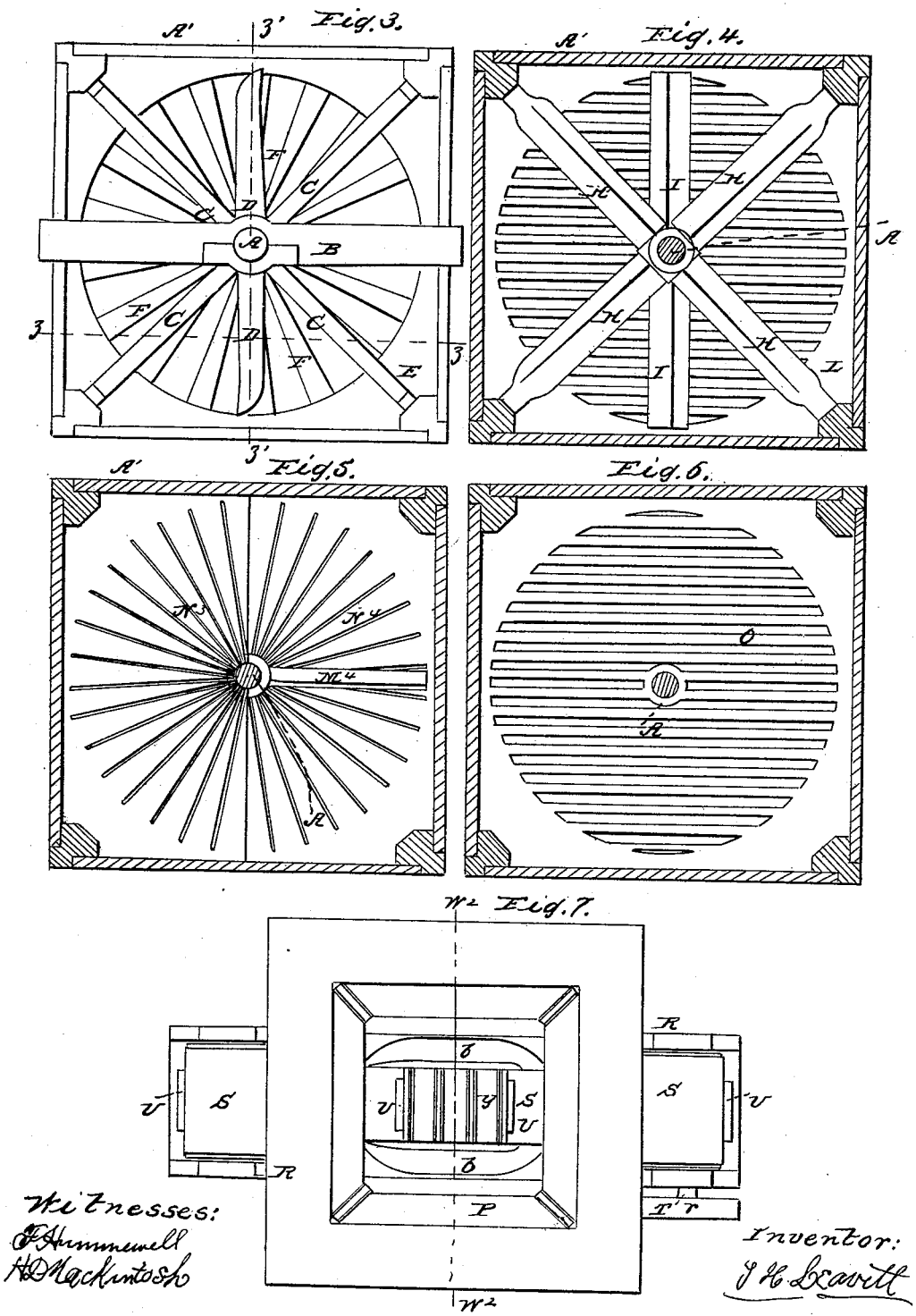

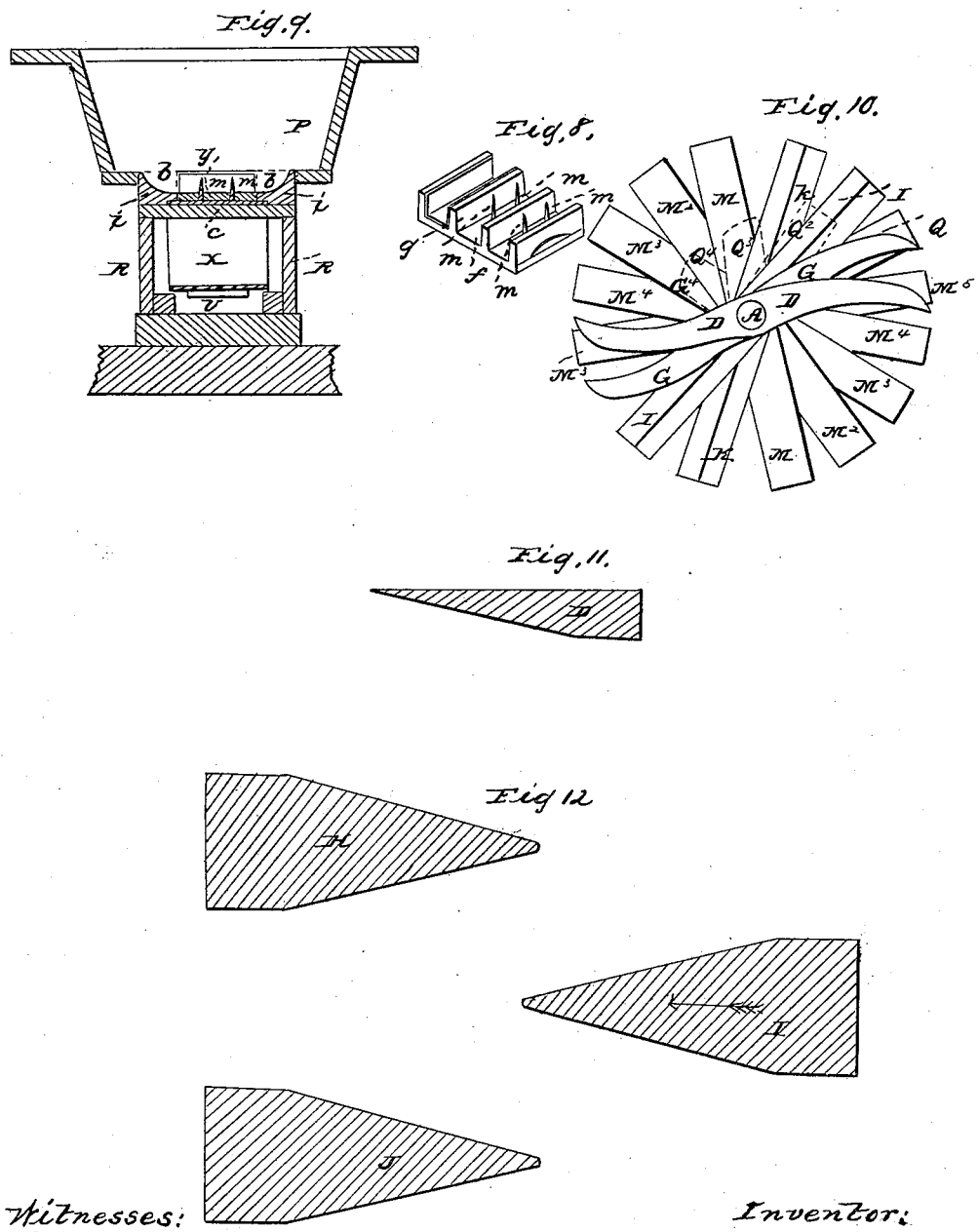

UNITED STATES PATENT OFFICE.

T. H. LEAVITT, OF BOSTON, MASSACHUSETTS.

IMPROVED PEAT-MACHINE.

Specification forming part of Letters Patent No. 53,011, dated March 6, 1866.

*To all whom it may concern:*

Be it known that I, T. H. LEAVITT, of Boston, in the county of Suffolk and State of Massachusetts, have invented certain Improvements in Machines for Treating Peat and Preparing it for use as Fuel, and for other purposes, of which the following is a full, clear, and exact description, reference being had to the accompanying drawings, making part of this specification, in which—

Figure 1 is a vertical section through the body of the machine upon the line $z\ z$ of Fig. 3, the revolving shaft with its arms, together with the molding-hopper beneath, being shown in elevation; Fig. 2, a vertical section upon the line $Z'\ Z'$ of Fig. 3, the revolving shaft with its arms being shown in elevation; Fig. 3, a plan of my machine; Fig. 4, a horizontal section on the line W W of Fig. 1; Fig. 5, a horizontal section on the line $x\ x$ of Fig. 1; Fig. 6, a horizontal section on the line $y\ y$ of Fig. 1; Fig. 7, a plan of the molding-hopper, showing a portion of the endless carrying-belt beneath it; Fig. 8, a view of a set of molds into which the prepared peat is condensed and in which it is molded; Fig. 9, a vertical section through the hopper on the line $W^2\ W^2$ of Fig. 7, and the parts immediately connected therewith; Fig. 10, a plan of the shaft, with the knives, crushers, rubbers, and mixers attached to it, the latter, $Q\ Q^2\ Q^3\ Q^4$, being shown in red; Fig. 11, section through one of the knives D; Fig. 12, section through one of the stationary crushers H and its corresponding revolving crusher.

The extensive deposits of peat which are found in different parts of the world have thus far been utilized only to a limited extent, owing partly to the bulk of the material in its crude state as compared with its weight when cut and dried in the ordinary manner, as well as to its extreme friability, which renders it an unpleasant fuel to use, from the amount of fine dirt-like material which results from handling it in this state, and, moreover, from the rapidity with which in this state it is consumed, owing to its light porous character, which may, perhaps, be compared in weight and inflamability to pine wood, and, further, owing to the difficulties which, despite of numerous and persistent efforts for many years, have attended the attempts made, both in this and foreign countries, to cleanse and condense it in such manner as to secure the greatest amount of serviceable fuel in the least space, while at the same time it should be made in form and substance so convenient and attractive as not only to command ready satisfaction in use, but to admit of being transported to a distance at a cost for space occupied in transit which would place it without objection among the list of merchantable articles of traffic and transportation.

The above difficulties arise from the peculiar nature of the crude material, and any system or process which would overcome them must be based upon a knowledge of its texture and composition. As found in the bog, peat consists, mainly, of vegetable matter in a more or less advanced state of decomposition, traversed by fibers and roots, which, through more or less extensive decay, are reduced to the state of hollow capillary tubes, the bark or exterior skin of the root being all that remains of it entire. These capillary tubes are interspersed through the entire mass of the peat, and form small reservoirs or receptacles, which, when the peat is first cut or dug, are filled with water and air. The mass of decomposed material or true peat also is cellular in its structure, and contains in like manner, besides the moisture which pervades it, a large amount of atmospheric air. When, therefore, the material is cut from the bog in its natural state and simply dried the tubes and cells are cleared of the water by evaporation, but the structure remains the same, and the tubes, cells, and pores, which had before been occupied by water and air, are found still remaining in their natural form, but filled with air alone, so that the mass is light, porous, and exceedingly friable. That it is a superior article of fuel is well known and universally acknowledged. If, then, it can be considerably reduced in bulk, made dense like coal, so as to stand a blast and endure under combustion a proportionately greater length of time, be rendered tough or tenacious instead of friable, and at the same time be produced in such form that it may be considered a clean fuel when compared with coal, preserving likewise all its properties of generating intense heat, it is evident that it may be considered as in attractive merchantable condition; and if, in addition to this, the process by which these results are obtained be simple and the machinery used be simple and inexpensive, it is evident that very desirable results in a business point of view have been attained.

The large per cent. of water contained in the tubes or cells before mentioned accounts for the great length of time required to dry peat by simple exposure to the sun and without other preparation, while the fibers with which it is interspersed prevent it from contracting and compacting as it dries, and retain it in a light porous state, which practically renders it unfit for transportation to any considerable distance, the consequence of which is that the use of peat thus cured is confined to the immediate vicinity of the bog from which it is cut. Various efforts have been made to remove these difficulties, and by the use of artificial means to divest the peat of its moisture and reduce its bulk; but, owing to the peculiar structure and natural characteristics of the cude material, these efforts have not been crowned with success.

The attempts to accomplish the desired end by submitting the peat to pressure have not been successful, for the water, being held in the capillary tubes before mentioned, is not expelled by simple pressure, and remains in the interior of the mass, to be subsequently expelled, as before, by the tedious process of drying, either by natural or artificial means. The attempt has also been made to reduce peat to a more homogeneous state, that it might become compact and less bulky as it dried, by raking out and separating the fibers from the thoroughly decomposed portions; but the partially-decayed fibers proved to have so little strength that it became necessary to reduce the consistence of the peat by the addition of large quantities of water, which it was afterwards found difficult to eliminate.

After repeated and careful experiments I have discovered that, in order to bring the peat into such a state that it shall quickly dry and at the same time contract into a compact and solid mass, it must first be submitted to pressure for the purpose of crushing its masses and lumps and breaking up and destroying its cohesion, in order to prepare it to be operated upon by the rubbers, to which it is subsequently submitted, for the purpose of destroying its cellular texture, as will be hereinafter more particularly described. It has been demonstrated, however, that simple pressure will not answer the desired end, and I have discovered that in order to break up the cohesion of the peat and prepare it for the finer operations to which it is to be subjected the pressing-surfaces must be forced or dragged past each other while the peat is between them, by which means the latter is crushed and mashed and its integrity and cohesion are broken down and destroyed. This end I gain by subjecting the crude material to the action of revolving crushers having inclined surfaces, which operate in connection with similar crushers that are stationary, the peat being pressed out from between the two opposing surfaces and crushed and mashed, as before stated, as the revolving crushers sweep round past the stationary ones. This combined action of the revolving and stationary crushers forms the subject of the first part of my invention.

The peat thus crushed now requires to be subjected to the more delicate action of surfaces acting in much greater proximity to each other, between which it is rubbed until its fibrous and cellular texture is entirely broken up and the tubes and cells containing air and water, as before mentioned, are completely destroyed, the air which they contain being expelled and the water either expelled or intimately and uniformly disseminated through the mass of the material. This latter operation is performed by means of revolving rubbers acting in conjunction with roughened plates, between which the peat is rubbed, as will hereinafter be more fully explained, and this conjoint action of the revolving rubbers and plates forms the subject of the second part of my invention.

When the peat is thus, by crushing and rubbing, reduced to a homogeneous mass without cohesion, having its fibers and cells destroyed, the air which they contained being expelled and the water disseminated through the mass, the particles of matter contract as evaporation goes on, each about the other, and as evaporation progresses (which I have discovered is very much expedited after the mass has been subjected to this treatment) the peat gradually becomes compact, solid, and dry, so that it may be employed as fuel either for the household or in the arts and be as readily transported as coal or wood.

By the crushing and rubbing operations above referred to most peat may be brought to a homogeneous and plastic state, and is greatly condensed and reduced in bulk by the crushing of the hollow tubes and by the expulsion of the air which they contained; but it is found that in addition to the decayed and partially decomposed and disorganized fibers, which may be easily broken up and thoroughly comminuted by the rubbers above mentioned, some peats contain fresh undecomposed roots, which have descended from the grass and other plants growing upon the surface, and these soon collect upon the revolving rubbers and impede their operation. It therefore becomes necessary to submit such peat to the preliminary action of knives for the purpose of cutting up and shortening these undecomposed fibers previous to subjecting it to the crushing and rubbing operations, and this I accomplish by means of revolving knives, which cut the lumps of peat into small pieces and so shorten the fibers and roots that they shall not offer any obstacle to the operation of the crushers and rubbers to which it is afterward subjected. These knives not only perform this duty of cutting up the peat, but they are so formed upon their under surfaces as to feed the peat into the machine and force it down within reach of the other operating parts. This twofold operation of the revolving knives forms the subject of the third part of my invention.

In the accompanying drawings, A' is a square box, which forms the body of my machine. This box is of suitable size to contain the devices for operating upon the peat, and is supported by posts or feet $A^2$. Through the center of this box descends the vertical shaft A, which is suitably suspended and supported by cross-bars B B, and to which a rotary motion is imparted by power applied to the pulley V at the upper end of the shaft.

C are four bars which extend from the corners or sides of the frame, and serve to prevent the mass of peat from being thrown into rotary motion by the revolving knives D beneath. These knives, which are seen in Figs. 1, 2, and 3, and in section, of the full size, in Fig. 11, are flat upon their upper surface and revolve immediately beneath and close to the lower surface of the bars C and cut the peat into thin slices as they pass around. Upon the under side the knives D are beveled, so as to force the peat down upon the plate E, and thus the feeding in of the material to the other operating parts of the machine is accomplished, each layer of peat as it is cut off the mass above by the revolving knives being immediately forced down upon and between the knives F of the plate E. These knives, which extend from the center to the rim of the wheel, support the peat as it is thrown into the machine and assist still further to slice or cut it up as it is forced down between them by the knives D, the cutting-edges of the knives F being turned in the direction opposite to that in which the knives D rotate.

The knives D may be placed more or less near the plate E, and serve thereby not only the purpose of cutting up the peat and of forcing it down upon and between the knives F, as before explained, but, being adjustable on the shaft A, they may be raised or lowered, and thus, as they are fixed more or less near to the plate E, they determine the quantity of peat which is fed into the apartment below at each revolution, or in a given time, so that the amount of material within the mill and under treatment may be uniformly the same, as it is practicable easily to regulate by the position of these knives the amount admitted at the top, so that it shall correspond exactly with the capacity of the machinery to discharge at the bottom.

The knives D, as also all the other operating parts, are, in practice, made adjustable upon the shaft. Moreover, the knives F may be replaced by simple bars, either radial or lateral; but with peats that are very fibrous it is preferable that the knives be used. As the peat emerges from between the knives F and enters the compartment B' it is again cut crosswise by the revolving knives G, which are essentially the same in character as the knives D, and like them are secured to the revolving shaft A. These knives G move close beneath the stationary knives F, and the peat, after passing them, is found to contain no roots or fibers of sufficient length to clog the crushers or rubbers, to the action of which it is now to be submitted. These knives are of similar form in section with the knives D, and assist to force down the peat and crush it between their beveled under surfaces and the beveled upper surfaces of the stationary crushers H, Figs. 1, 2, and 4, which are secured to the corner-posts of the machine, from which they project toward the center shaft. The edges of these crushers are presented in a direction contrary to the direction of the motion of the knives G, and are of the form seen in section in Fig. 12, having both above and below their edges steep inclined surfaces. Between the upper inclined surface thus formed and the beveled under side of the revolving knives G the peat already divided and cut up is mashed and crushed, and as it descends through the machine it is similarly crushed between the lower beveled surfaces of the rubbers H and the upper beveled surfaces of the revolving rubbers I, which are secured to the shaft A, and are similar in cross-section to the rubbers H. The crushing operation continues as the peat descends between the lower surface of the rubbers I and the upper surface of the stationary rubbers J, which are similar to the others H, and again between the rubbers J and K, the latter being secured to the shaft, and similar in form to those above them, I. These revolving and stationary crushers may be multiplied indefinitely; but I have found that in practice the number represented in the accompanying drawings is sufficient for the manipulation of the ordinary peats of the country and to bring them into the required state for the next operation to which it is to be subjected in the compartment $B^2$ below.

After passing the crushers K the peat is forced, by their inclined under surfaces, down through long narrow slots, Figs. 1, 2, and 4, in a plate, L immediately beneath. This plate may be furnished with perforations of any other character in form that will permit the peat to pass through as it is forced down by the crushers above.

As the peat passes through the plate L it enters a chamber, $B^2$, which extends to the lower slotted plate, O, and in which it is subjected to the action of the rubbers, by which, in conjunction with stationary plates, the minute cells and tubes with which it is filled are ruptured and the air which they contained is expelled.

Immediately beneath the plate L are four (more or less) non-perforated plates, N $N^2$ $N^3$ $N^4$, which extend half-way across the chamber $B^2$, and above each of these half-plates revolve one or more inclined rubbers, M $M^2$ $M^3$ $M^4$. These rubbers run over and close to the plates, so that the peat is rolled and rubbed first over the surface of the plate N, from which it falls down upon the plate $N^2$, Fig. 1, over which it is again carried and still further rubbed, and so on over and off from all the plates, until at last it is scraped off the plate N⁴ onto the slotted plate O, Fig. 6, through the interstices of which it passes, being forced down by its weight, assisted by the pressure produced by the action of the revolving rubbers above described, and particularly by one or more inclined arms, M⁵, which, like the others, are secured to the shaft A and revolve with it.

The surfaces of the plates N may be roughened by means of grooves or scores in any suitable manner, and the rubbers M are made to run very nearly in contact with them, and as the latter are inclined forward they drag the peat over the surface of the plates, and thus by degrees, as its cellular texture is broken up, as before described, the peat is brought to a homogeneous plastic state.

In lieu of being roughened and non-perforated, the plates N may be perforated either by slots or simple holes, through which the peat may pass, instead of being scraped off from one plate upon another, as above described. In such case the plates may extend entirely across the machine, instead of half-way across, as represented in the drawings.

For the more perfect treatment of some kinds of peat, especially those which retain in their structure any considerable amount of partially-decayed or tough fiber, the perforated plates are to be preferred.

The peat emerges from the interstices in the plate O in thin plastic, but strong, flakes, and is found at this stage to have been condensed to the extent ordinarily of from thirty to forty per cent. of its original bulk, having been relieved, however, of nothing whatever except the air contained, as before mentioned.

It is found, however, that if the peat be molded when in this state the blocks formed will remain laminated, and may be easily broken in layers, there being layers of air between the layers or flakes, until it is dried. It therefore becomes necessary still further to operate upon it in order to liberate the air thus introduced, and for this purpose I employ the hopper P, with the inclined revolving sweeps or mixers Q Q² Q³ Q⁴, which are secured to the shaft A, and by their action upon the peat as the shaft revolves completely set free the air and again bring the whole into a homogeneous plastic mass, ready to be molded into blocks or bricks for drying.

The hopper P, which receives the peat as it drops through the grating or slotted plate O, rests upon the frame R, Figs. 1, 2, 7, and 9, the top of which, c, forms a table, which carries and supports the traveling apron or belt S upon which the molds are traversed into and out of the machine. This apron is carried by the drums X upon the shaft V², to which a rotary motion is imparted in the direction of the arrows, Fig. 2, by power applied to the pulley T. The shaft A descends to the bottom of the hopper, and carries four inclined sweeps, Q Q² Q³ Q⁴, arranged spirally one above the other. As these sweeps revolve they stir up the prepared peat, and thus liberate the air which was introduced into the mass by the previous operation, as already described, the air escaping in bubbles from the top of the mass.

The bottom of the hopper is closed by the table C, upon which runs the endless belt S, to which are secured, at suitable distances, the blocks U, between which are placed the molds Y, Figs. 2 and 9.

It is evident that in practice the blocks U should fill the entire space intervening between the molds in order to prevent waste of material.

The molds y are caused to traverse through the machine in the direction of the arrows, Fig. 2, by power applied to the pulley T, Fig. 1, as before mentioned.

The weight of the prepared peat which is kept constantly stirred up by the inclined arms Q is sufficient to fill the molds loosely; but in order to compact it as much as possible into the molds the following device is employed: The molds are formed of a bottom board, f, and side pieces, g, Fig. 8, the ends being left open, and the bottom of the hopper is cut away on each side at b, Figs. 7 and 9, so that as the peat is pressed down by its weight and by the action of the sweeps Q it enters the tops of the molds, and also fills the space b at their ends, where the bottom of the hopper is cut away. This space b is widest in the center and gradually diminishes toward the side of the hopper from which the molds leave it, so as to force the peat into the open ends of the molds and at the point where the molds enter beneath the board Z before leaving the machine. The bottom pieces, i, of the hopper are vertical and inclose the path of the molds, so as to stop up their ends, as seen in red in Fig. 9. This gradual narrowing of the trough in which the molds run may be accomplished by simply making it wider in the center than at the point where the molds enter beneath the board Z. This board or scraper at its inner edge is one inch (more or less) above the tops of the molds, but at its outer edge it comes down in contact with them, Fig. 2, and thus while the ends of the molds are closed for the time by the sides of the recess in the bottom of the hopper, as seen in red in Fig. 9, the peat is still further compacted by the inclined board Z.

The molds as they come from the machine are taken by off-bearers and inverted either upon the drying-ground or upon suitable frames, where the bricks or lumps of peat are suffered to dry. When thus prepared and dried the peat is greatly reduced in bulk and weight, is solid and compact, and furnishes a superior article of fuel either for the household or for manufacturing purposes. The size and form of these molds with open ends may be varied at pleasure.

In order still further to facilitate the drying of the peat and to preserve the blocks or bricks as near as may be in rectangular form, I insert pointed pins m into the molds, of a length that shall nearly penetrate through the blocks, and thus each block is perforated nearly through by holes, which admit the air to the center of the mass and facilitate the escape of moisture from the inner portion of the block, thus materially shortening the time required for the drying of the peat.

It is manifest that some means must be adopted to prevent the wet and plastic peat from adhering to the molds. For this purpose I have adopted several expedients; but that which I prefer consists in dusting the interior of the molds with dry powdered peat. As this, however, forms no part of my present invention, but will be the subject of another application for patent made simultaneously with this, it need not now be further described.

The dimensions of my machine may be varied to a considerable extent, according to the amount of work to be done or the power available for the purpose of driving it. The same, also, may be said of the distances of the knives, crushers, and rubbers from each other and from the parts in connection with which they operate, as well as of the number of these various parts employed.

In the machine which I have now in successful operation the height of the box A', exclusive of the hopper P and between the timbers B B, is five feet four inches and the width of the box inside three feet, the length of the various arms attached to the shaft A and working within the box being seventeen and three-fourth inches from the center of the shaft.

The molds Y are eight inches by four inches by two inches.

The distance between the edge of the knife D and the upper edges of the knives F is three-fourths of an inch, or thereabout. If the knife be placed higher, the material will be fed more rapidly through the machine. If the distance be less, the feed will be proportionately reduced.

The shaft A in my machine makes twenty revolutions in a minute, or thereabout.

The revolving crushers I move within one-fourth to one-half inch from the stationary crushers above and below them.

In practice I have found that seven of the half-plates N, with their rubbers M, are sufficient to perfect the preparation of the peat after it comes from the crushers H I J K.

What I claim as my invention, and desire to secure by Letters Patent, is—

1. The revolving crushers I and K, or their equivalents, in combination with the stationary crushers H and J, or their equivalents, operating as set forth, for the purpose specified.

2. The revolving rubbers M, in combination with the plates N, or their equivalents, for the purpose described.

3. The knives D, so formed as to cut up the peat and feed it into the machine, as set forth.

4. The hopper P, with its sweeps or mixers Q, for the purpose of expelling the air from the mass of prepared peat as it comes from the condensing machinery.

5. The molds Y, having open ends, in combination with the peculiar form of the bottom of the hopper, whereby the peat is compacted and pressed into the molds, as described.

6. The pins $m$ in the molds, operating as described, for the purpose set forth.

T. H. LEAVITT.

Witnesses:
F. HUNNEWELL,
H. B. MACKINTOSH.